United States Patent [19]
Haufler et al.

[11] Patent Number: 5,687,505
[45] Date of Patent: Nov. 18, 1997

[54] PLANT PEN

[76] Inventors: Robert W. Haufler; Suzanne Haufler, both of 3 Felway Dr., Coram, N.Y. 11727

[21] Appl. No.: 680,137

[22] Filed: Jul. 15, 1996

[51] Int. Cl.[6] .................................................. A01G 9/02
[52] U.S. Cl. .................................................. 47/72; 47/30
[58] Field of Search .............................. 47/30, 300 T, 72; 52/169.7

[56] References Cited

U.S. PATENT DOCUMENTS

| | | | |
|---|---|---|---|
| 3,486,289 | 12/1969 | Lavack | 52/169.7 |
| 4,018,003 | 4/1977 | Mirecki | 47/300 T |
| 4,829,707 | 5/1989 | Koffler et al. | 47/300 T |
| 5,426,887 | 6/1995 | Spencer et al. | 47/300 T |

FOREIGN PATENT DOCUMENTS 2128462  5/1984  United Kingdom ................. 47/300 T

*Primary Examiner*—Terry Lee Melius
*Assistant Examiner*—Joanne C. Downs
*Attorney, Agent, or Firm*—Michael I. Kroll

[57] ABSTRACT

A plant pen (10) for a floor standing house plant/tree (12) having a pot (14), fertilized soil (16), stem (18) and branches (20). The plant pen (10) comprises a facility (22) placed about the pot (14), fertilized soil (16), stem (18) and branches (20) of the floor standing house plant/tree (12), for preventing a toddler (24) and pet (26) from getting into the fertilized soil (16) in the pot (14), protecting the floor standing house plant/tree (12) from the toddler (24) and pet (26), while also holding up the low hanging branches (20) of the floor standing house plant/tree (12).

1 Claim, 3 Drawing Sheets

PLANT PEN

BACKGROUND OF THE INVENTION

1. Field of the Invention

The instant invention relates generally to protective devices and more specifically it relates to a plant pen.

2. Description of the Prior Art

Numerous protective devices have been provided in the prior art that are adapted to shield persons, places and things from harm, attack and injury. While these units may be suitable for the particular purpose to which they address, they would not be as suitable for the purposes of the present invention as heretofore described.

SUMMARY OF THE INVENTION

A primary object of the present invention is to provide a plant pen that will overcome the shortcomings of the prior art devices.

Another object is to provide a plant pen that is used around a floor standing house plant or tree, to prevent a toddler and pet from getting into the fertilized soil in the pot.

An additional object is to provide a plant pen that will protect the floor standing house plant or tree from the toddler and pet, while also holding up low hanging branches of the floor standing house plant or tree.

A further object is to provide a plant pen that is simple and easy to use.

A still further object is to provide plant pen that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
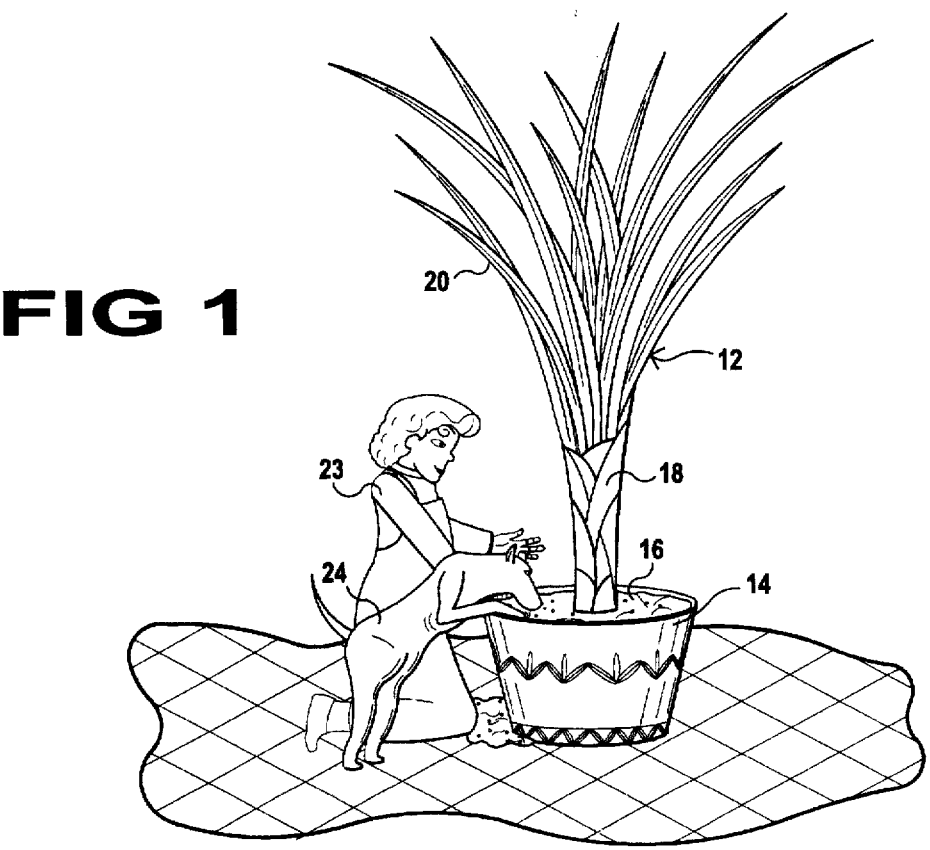
FIG. 1 is a perspective view of a floor standing house plant without the instant invention installed, showing a toddler and pet getting into the fertilized soil.

Turning now descriptively to the drawings, in which similar reference characters denote similar elements throughout the several views, FIGS. 2 through 8 illustrate a plant pen 10 for a floor standing house plant/tree 12 having a pot 14, fertilized soil 16, stem 18 and branches 20. The plant pen 10 comprises a facility 22 placed about the pot 14, fertilized soil 16, stem 18 and branches 20 of the floor standing house plant/tree 12 for preventing a toddler 23 and pet 24 from getting into the fertilized soil 16 in the pot 14, protecting the floor standing house plant/tree 12 from the toddler 23 and pet 24, while also holding up the low hanging branches 20 of the floor standing house plant/tree 12. FIG. 1 shows the toddler 23 and pet 24 going into the fertilized soil 16 in the pot 14, since there is no plant pen 10 being utilized to keep them out.

The preventing and protecting facility 22 includes a flexible sheet 25. A structure 26 is for holding opposite side edges 28, 30 of the flexible sheet 25 together when the flexible sheet 25 is formed into a cylindrical shape. A first component 32 is for enhancing safety and appearance to a top edge 34 of the flexible sheet 25, when the flexible sheet 25 is formed into the cylindrical shape.

A second component 36 is for enhancing safety and appearance to a bottom edge 38 of the flexible sheet 25, when the flexible sheet 25 is formed into the cylindrical shape. The flexible sheet 25 is a broad flat generally rectangular thin piece of transparent plastic material 40.

The holding structure 26 consists of two VELCRO strips 42 and 44. A substance 46 is for securing each of the VELCRO strips 42 and 44 onto the flexible sheet 25 adjacent a side edge 28, 30. When the flexible sheet 25 is formed into the cylindrical shape, the VELCRO strips 42 and 44 will overlap each other and mate together in a removable manner. Each securing substance 46 is adhesive 48 applied onto a rear surface of the VELCRO strip 42, or 44, so that the VELCRO strip 42 or 44 will stick to the flexible sheet 25.

The first enhancing component 32 is a first piece of tubing 50, having a longitudinal slit 52 to fit upon the top edge 34 of the flexible sheet 25. The first piece of tubing 50 is fabricated out of flexible plastic material 54. The second enhancing component 36 is a second piece of tubing 56, having a longitudinal slit 58 to fit upon the bottom edge 38 of the flexible sheet 25. The second piece of tubing 56 is also fabricated out of the flexible plastic material 54.

OPERATION OF THE INVENTION

To use the plant pen 10, the following steps should be taken:

1. Place the flexible sheet 25 upon a flat surface.

2. Press the adhesive 48 on the first VELCRO strip 42 onto the flexible sheet 25 adjacent the first side edge 28.

Figure 3:
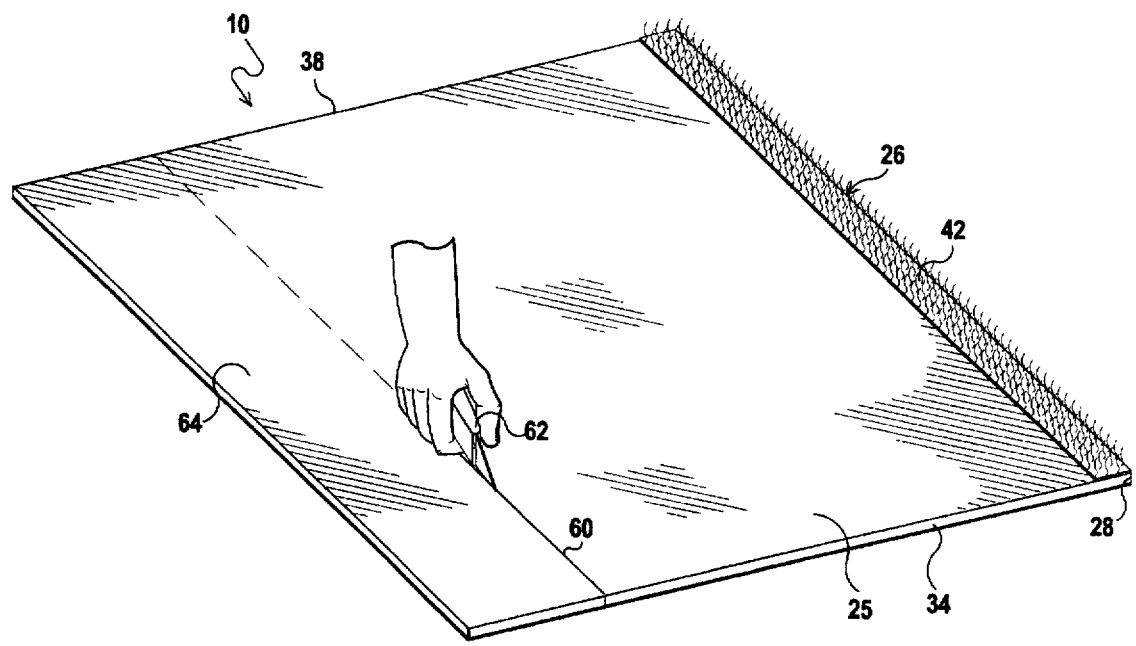
FIG. 3 is a perspective view, showing the flexible sheet flat with one side edge being cut back to adjust the size thereof.

3. Cut along a straight line 60 with a utility knife 62 to remove a portion 64 of the flexible sheet 25, to properly size the flexible sheet 25, as shown in FIG. 3.

Figure 4:
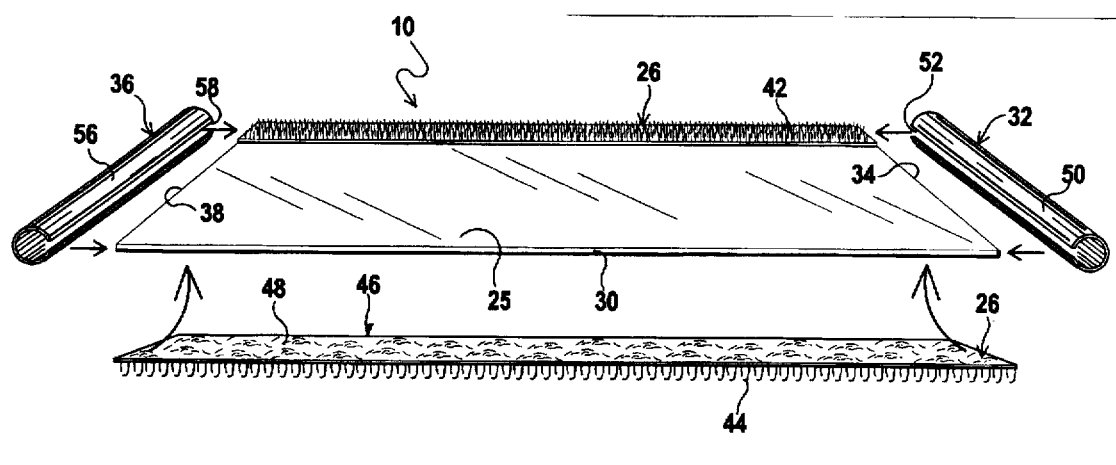
FIG. 4 is an exploded perspective view, showing the various components thereof ready to be assembled before the flexible sheet is formed into a cylindrical shape.
Figure 5:
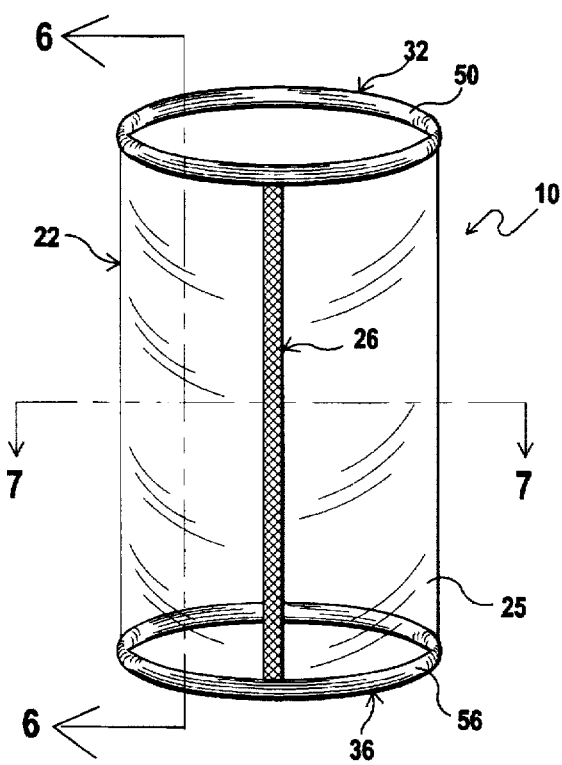
FIG. 5 is a perspective view of the instant invention per se, formed into the cylindrical shape.
Figure 6:
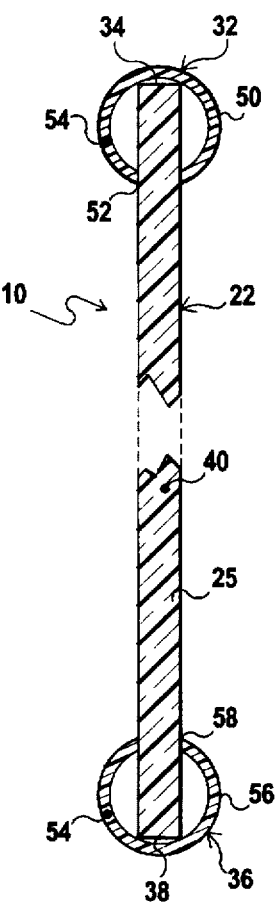
FIG. 6 is a cross sectional view taken along line 6—6 in FIG. 5 with parts broken away.
Figure 7:
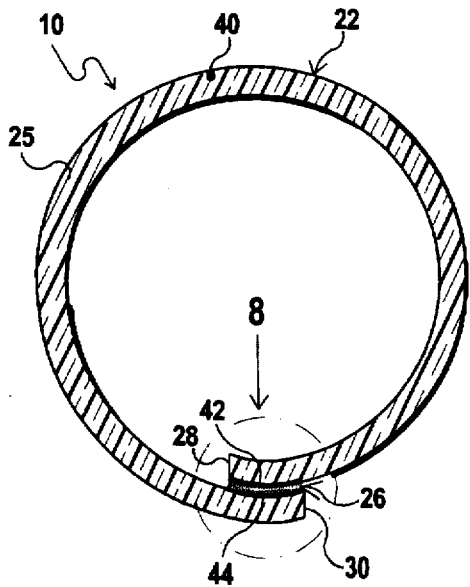
FIG. 7 is a cross sectional view taken along line 7—7 in FIG. 5.
Figure 8:
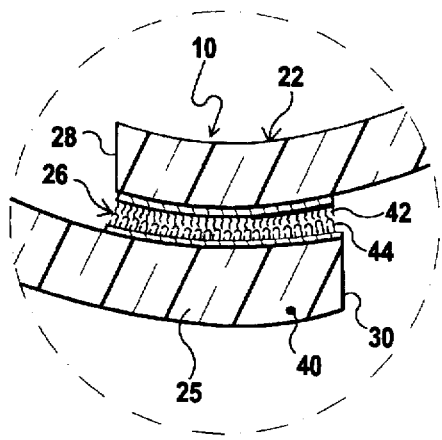
FIG. 8 is an enlarged view of the fastening means of FIG. 7.

4. Press the adhesive 48 on the second VELCRO strip 44 onto the opposite side of the flexible sheet 25 adjacent the second side edge 30, as shown in FIG. 4.

5. Insert the longitudinal slit 52 of the first piece of tubing 50 onto the top edge 34 of the flexible sheet 25, as shown in FIG. 4.

6. Insert the longitudinal slit 58 of the second piece of tubing 56 onto the bottom edge 38 of the flexible sheet 25, as shown in FIG. 4.

7. Roll up the flexible sheet 25 into the cylindrical shape about the floor stand house plant/tree 12 in the pot 14.

Figure 2:
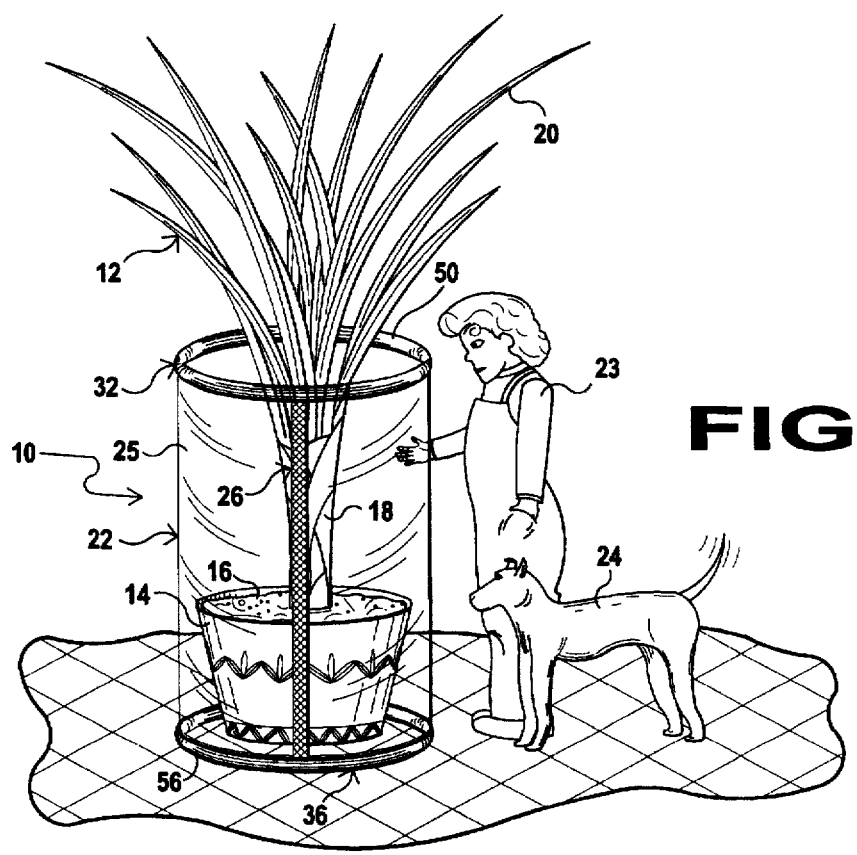
FIG. 2 is a perspective view of the floor standing house plant with the instant invention installed, showing the toddler and pet prevented from getting into the fertilized soil.

8. Put the first VELCRO strip 42 over the second VELCRO strip 44, so that they will mate with each other, to keep the toddler 23 and the pet 24 away, as shown in FIG. 2.

LIST OF REFERENCE NUMBERS 10 plant pen
12 floor standing house plant/tree
14 pot
16 fertilized soil
18 stem
20 branches
22 preventing and protecting facility
23 toddler
24 pet
25 flexible sheet
26 holding structure of 22
28 first side edge of 25
30 second side edge of 25
32 first enhancing component of 22
34 top edge of 25
36 second enhancing component of 22
38 bottom edge of 25
40 broad flat generally rectangular thin piece of transparent plastic material for 25
42 first VELCRO strip of 26
44 second VELCRO strip of 26
46 securing substance of 26 on 42 and 44
48 adhesive for 46
50 first piece of tubing for 32
52 longitudinal slit in 50
54 flexible plastic material for 50 and 56
56 second piece of tubing for 36
58 longitudinal slit in 56
60 straight cut line in 25
62 utility knife
64 cut away portion of 25

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A plant pen assembly in combination comprising:

a) a floor standing house plant including a pot, fertilized soil within said pot, and a plant stem and branches including low hanging branches extending up from said pot;

b) a plant pen comprising a flexible sheet of broad flat generally rectangular thin transparent plastic material formed into a vertical floor standing cylinder surrounding said house plant and being open at the top to support low hanging branches and at the bottom with the two vertical side edges overlapping each other;

c) means for holding said vertical side edges of said flexible sheet together comprising a strip of engageable hook and loop material on each of said vertical side edges facing each other to mate together in a removable manner; and d) means for enhancing the safety and appearance of the top and bottom edges of said cylinder comprising a first piece of tubing having a longitudinal slit to fit upon the top edge of said flexible sheet and a second piece of tubing having a longitudinal slit to fit upon the bottom edge of said flexible sheet, said second piece of tubing sitting on said floor, the top edge of said flexible sheet extending through the slit in the first piece of tubing and touching the top of the inner surface of said first piece of tubing with the edges of the first piece of tubing defining the slit therein being biased against the surfaces of said flexible sheet, and the bottom edge of said flexible sheet extending through the slit in the second piece of tubing and touching the bottom inside surface of said second piece of tubing and the edges of the second piece of tubing defining the slit therein being biased against the surfaces of said sheet.

* * * * *